(12) United States Patent
Oshima (10) Patent No.: US 7,251,750 B2
(45) Date of Patent: Jul. 31, 2007

(54) APPARATUS DIAGNOSTIC DEVICE AND DIAGNOSED DEVICE

(75) Inventor: Osamu Oshima, Nagaokakyo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 581 days.

(21) Appl. No.: 10/465,374

(22) Filed: Jun. 19, 2003

(65) Prior Publication Data

US 2004/0003320 A1 Jan. 1, 2004

(30) Foreign Application Priority Data

Jun. 28, 2002 (JP) ............................. 2002-189586

(51) Int. Cl.
*G06F 11/00* (2006.01)
(52) U.S. Cl. .............................. 714/25; 714/48; 714/57
(58) Field of Classification Search .................. 714/48, 714/57
See application file for complete search history.

(56) References Cited

U.S. PATENT DOCUMENTS

| 6,006,016 | A * | 12/1999 | Faigon et al. .................. 714/48 |
| 6,154,712 | A * | 11/2000 | Breu et al. ..................... 702/82 |
| 6,321,148 | B1 * | 11/2001 | Leung ........................... 701/29 |
| 6,370,656 | B1 * | 4/2002 | Olarig et al. .................. 714/23 |
| 6,381,712 | B1 * | 4/2002 | Nemitz ......................... 714/57 |
| 6,442,542 | B1 * | 8/2002 | Ramani et al. ................. 707/3 |
| 6,531,872 | B1 * | 3/2003 | Carr et al. .................... 324/379 |
| 6,618,825 | B1 * | 9/2003 | Shaw ........................... 714/55 |
| 6,662,318 | B1 * | 12/2003 | Baysah et al. ................. 714/48 |
| 6,718,490 | B1 * | 4/2004 | Takemoto et al. ............. 714/47 |
| 6,754,855 | B1 * | 6/2004 | Denninghoff et al. ......... 714/48 |
| 6,782,496 | B2 * | 8/2004 | Fleming ....................... 714/55 |
| 6,839,867 | B2 * | 1/2005 | Nunn et al. .................... 714/36 |
| 6,865,691 | B1 * | 3/2005 | Brundridge et al. .......... 714/25 |
| 6,868,319 | B2 * | 3/2005 | Kipersztok et al. ........... 701/29 |
| 6,915,343 | B1 * | 7/2005 | Brewer et al. ............... 709/224 |
| 2002/0174380 | A1 * | 11/2002 | Mannarsamy ................ 714/25 |
| 2003/0056140 | A1 * | 3/2003 | Taylor et al. .................. 714/4 |
| 2003/0105995 | A1 * | 6/2003 | Schroath et al. .............. 714/48 |
| 2003/0110248 | A1 * | 6/2003 | Ritche ......................... 709/224 |
| 2004/0039743 | A1 * | 2/2004 | Maleport et al. ............. 707/10 |

FOREIGN PATENT DOCUMENTS

| JP | 05-193855 | 8/1993 |
| JP | 08-030152 | 2/1996 |
| JP | 08166934 A * | 6/1996 |
| JP | 08-195849 | 7/1996 |
| JP | 09-230753 | 9/1997 |
| JP | 10-198235 | 7/1998 |
| JP | 10-307062 | 11/1998 |
| JP | 11-219075 | 8/1999 |
| JP | 2000-098820 | 4/2000 |
| JP | 2001283539 A * | 10/2001 |

* cited by examiner

*Primary Examiner*—Scott Baderman
*Assistant Examiner*—Loan Truong
(74) *Attorney, Agent, or Firm*—Hogan & Hartson LLP (57) ABSTRACT

An apparatus diagnostic device includes a communication unit that communicates with a diagnosed device through a communication line, and a control unit that controls to receive a problem generation notification from the diagnosed device via the communication unit, to determine whether or not to solve a problem in accordance with apparatus status information obtained from the diagnosed device after an elapse of a prescribed period of time, and to have a notification standard of the problem generation notification changed by the diagnosed device when necessary.

7 Claims, 4 Drawing Sheets

APPARATUS DIAGNOSTIC DEVICE AND DIAGNOSED DEVICE

BACKGROUND OF THE INVENTION

1. Field of the Invention

The present invention relates to an apparatus diagnostic system which diagnoses a remote diagnosed device by transmitting a problem generation notification to an apparatus diagnostic device when a problem is generated in the diagnosed device.

2. Description of the Related Art

There is a conventional apparatus diagnostic system which detects problems such as a diagnosed device malfunctioning, and automatically sends a problem generation notification to an apparatus diagnostic device of a service center or the like via a communication line. The apparatus diagnostic device analyzes the problem generation notification transmitted from the diagnosed device. When necessary, contact is made with a user of the diagnosed device, or a maintenance worker makes a visit to repair the diagnosed device.

In such a conventional apparatus diagnostic system, when detecting a prescribed problem, the diagnosed device uniformly carries out a problem generation notification to the apparatus diagnostic device. However, according to the nature of the problem, there are types of problems that can be dealt with easily by the user of the diagnosed device. When the problem can be handled easily by the user of the diagnosed device and an instruction is made from the service center by telephone or a maintenance worker makes a visit to the diagnosed device, the user is disturbed by this service.

However, it cannot be determined uniformly whether or not the user who is actually using the diagnosed device can deal with the generated problem. The reason is because whether or not the user can deal with the problem is based on the experience of the user or the knowledge of the user of the diagnosed device. In addition, the user can deepen the experience or the knowledge of the diagnosed device through the use of the diagnosed device, and the ability of the user to deal with the problems changes over time.

In the conventional apparatus diagnostic system, for example, the diagnosed device and the apparatus diagnostic device could not deal with the above-mentioned changes in the experience or the knowledge of the user over time. Therefore, there are problems that the user was disturbed or maintenance costs increased due to unnecessary instructions by telephone calls or visits. In addition, there exists a diagnosed device in which a standard for transmission of the problem generation notification can be set. However, the user or the maintenance worker is required to set the standard manually using an operation panel of the diagnosed device or the apparatus diagnostic device, and thus it is troublesome.

SUMMARY OF THE INVENTION

The present invention was made in consideration to the above-described problems. An advantage of the present invention is to provide an apparatus diagnostic system which can prevent a user of each diagnosed device from being disturbed and which can reduce unnecessary maintenance costs by presenting only services that are necessary for each of the users of the diagnosed device.

An apparatus diagnostic device of the present invention to be used in an apparatus diagnostic system includes a communication unit which communicates with a diagnosed device through a communication line. In addition, the apparatus diagnostic device includes a control unit which receives a problem generation notification from the diagnosed device via the communication unit, and which controls the diagnosed device to change a notification standard of the problem generation notification when necessary. For example, when a prescribed period of time elapses after receiving the problem generation notification, the control unit determines whether or not the problem has been solved in accordance with apparatus status information obtained from the diagnosed device. Alternatively, the control unit determines whether or not to solve the problem in accordance with a determination of whether or not a problem solved notification has been received from the diagnosed device within a prescribed period of time after receiving the problem generation notification. Especially when it is determined that the problem has been solved in accordance with the apparatus status information, an instruction can be sent to the diagnosed device to change the notification standard of the problem generation notification for more severe problems. Accordingly, for example, even when a problem is generated, if the user solves the problem within a prescribed period of time, this type of problem can be excluded from a subject of transmission of the problem generation notification for all notifications thereafter. Therefore, contact is not made with the service center or the maintenance worker does not have to make a visit for the problem which can be solved by the user. As a result, the user is not disturbed by unnecessary contacts or visits, and the maintenance costs can be reduced.

In addition, the diagnosed device of the present invention to be used in the apparatus diagnostic system includes a communication unit which communicates through a communication line, a storage unit which stores a notification standard which is a standard for determining whether or not to transmit a problem generation notification, and a control unit which changes the notification standard when necessary. When a problem is generated, the control unit references the notification standard stored in the storage unit. In case the notification standard is satisfied, the control unit transmits the problem generation notification to the apparatus diagnostic device via the communication unit. Moreover, for example, when a prescribed period of time elapses after the generation of the problem, the control unit determines whether or not the problem has been solved. Then, according to the determination result, the control unit determines whether or not it is necessary to change the notification standard. Also in this case, when it is determined that the problem has been solved after an elapse of a prescribed period of time from the generation of the problem, the notification standard for the problem can be changed to more severe problems. The problems that can be solved by the user can be controlled to be excluded from the subject of transmission of the problem generation notification for all notifications thereafter. Accordingly, contact is not made from the service center or the maintenance worker does not have to make a visit for the problem that can be solved by the user. Therefore, the user can be prevented from being disturbed, and the maintenance costs can be reduced.

Further, even when the notification standard stored in the storage unit is referenced at the generation of the problem, and the problem generation notification is not transmitted due to the notification standard not being satisfied, it can be determined after an elapse of a prescribed period of time, whether or not the problem has been solved. Then, when it is determined that the problem has not been solved, the notification standard for the problem can be changed for less severe problems. For example, even for the same type of problem, there are times when the user can solve the problem and times when the user cannot solve the problem. In addition, even for the same type of problem, if a long period of time has passed since the generation of the last problem, there are times when the user does not remember a method for solving the problem. Furthermore, even for the same type of problem, there are times when the user in charge has changed, and the problem cannot be handled. In such cases, under the notification standard in which the problem generation notification is not notified, even when similar types of problems are generated thereafter, service cannot be presented to the user, and the satisfaction level of the user decreases. Therefore, the notification standard can be changed automatically such that the problem generation notification is transmitted from the next time, and when a similar type of problem occurs, the problem generation notification can be sent.

DETAILED DESCRIPTION OF THE PREFERRED EMBODIMENTS

Figure 1:
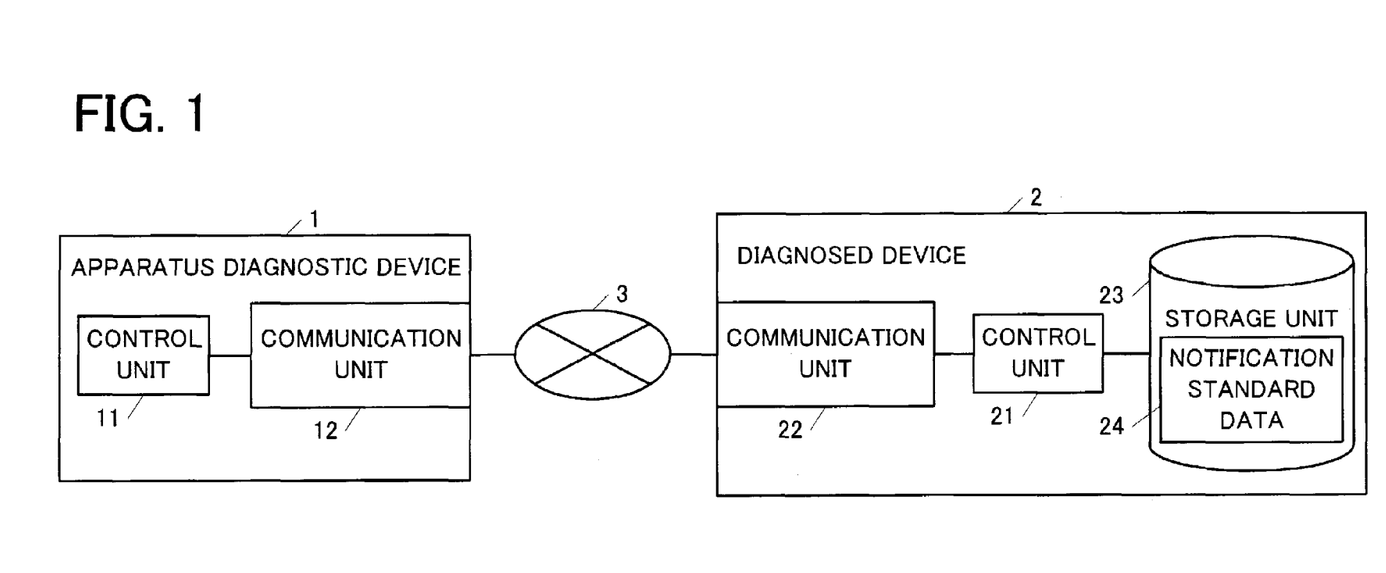
FIG. 1 is a block diagram showing an example of a system including a first embodiment of the present invention.

FIG. 1 is a block diagram showing an example of a system including a first embodiment of the present invention. In the drawing, reference number 1 is an apparatus diagnostic device, 2 is a diagnosed device, 3 is a network, 11 is a control unit, 12 is a communication unit, 21 is a control unit, 22 is a communication unit, 23 is a storage unit, and 24 is notification standard data.

The apparatus diagnostic device 1 (center terminal) receives a problem generation notification from one or a plurality of diagnosed device (user terminal) via the network 3. Then, the apparatus diagnostic device 1 diagnoses the problem in accordance with the content of the notification. In accordance with the diagnosed result, for example, the user of the diagnosed device can be contacted by telephone, or a maintenance worker can make a visit.

The apparatus diagnostic device 1 includes the control unit 11, the communication unit 12 or the like. The communication unit 12 communicates with the diagnosed device 2 or the like (diagnosed device subject of diagnosis) through the network 3.

The control unit 11 receives the problem generation notification transmitted from one or a plurality of diagnosed device including the diagnosed device 2 via the network 3 through the communication unit 12. Then, the control unit 11 diagnoses the problem in accordance with the content of the notification, and sends the diagnosed result to an operator of the apparatus diagnostic device 1 or to a remote device. At this time, when a prescribed period of time elapses after receiving the problem generation notification, the apparatus diagnostic device 1 obtains apparatus status information, which includes information indicating the status of the diagnosed device, from the diagnosed device which transmitted the problem generation notification (the diagnosed device which is the transmitter of the problem generation notification). Then, the apparatus diagnostic device 1 analyzes the obtained apparatus status information, and determines whether or not the problem has been solved. Alternatively, the apparatus diagnostic device 1 determines whether or not a notification which notifies that the problem has been solved, is received from the diagnosed device before an elapse of a prescribed period of time, to determine whether or not the problem has been solved. As a result of the determination, when it is determined that the problem has been solved, the diagnosed device is controlled to change the notification standard of the problem generation notification for more severe problems. Moreover, when it is determined that the problem has not been solved, processing to handle the problem is executed.

For a change in the notification standard, for example, the notification standard can be changed such that the problem generation notification is not transmitted for a similar type of problem, or a period of time from the generation of the problem until carrying out the problem generation notification can be lengthened. Alternatively, a setting of a threshold can be changed, or other conditions can be added to the notification standard. A method for changing the notification standard sent to the diagnosed device can be any method. For example, the diagnosed device can be instructed to rewrite the notification standard. Alternatively, a relative instruction can be sent to the diagnosed device such that to change the standard by one-stage. The diagnosed device changes the notification standard in accordance with the instruction from the apparatus diagnostic device 1.

The diagnosed device 2 is one of the diagnosed devices which are subject of diagnosis by the apparatus diagnostic device 1. The diagnosed device 2 can be any device which can communicate with at least the apparatus diagnostic device 1, and which carries out the problem generation notification to the apparatus diagnostic device 1 when a problem occurs. In this example, the diagnosed device 2 includes a function for transmitting the apparatus status information according to a request from the apparatus diagnostic device 1. Here, the diagnosed device 2 includes the control unit 21, the communication unit 22, the storage unit 23 or the like.

The control unit 21 controls to execute the above-described function of the diagnosed device 2. That is, when detecting a generation of a problem in the diagnosed device 2, the control unit 21 determines whether or not the problem is subject of transmission of the problem generation notification to the apparatus diagnostic device 1 in accordance with the notification standard data 24 stored in the storage unit 23. Then, when it is determined that the problem is subject of the transmission of the problem generation notification, the control unit 21 transmits the problem generation notification to the apparatus diagnostic device 1 via the communication unit 22. When receiving a request to notify the apparatus status information from the apparatus diagnostic device 1 via the communication unit 22, the control unit 21 transmits to the apparatus diagnostic device 1 via the communication unit 22, the apparatus status information which includes the information indicating the status of the diagnosed device 2 at that time. Further, if a problem has been generated in the diagnosed device 2, the apparatus status information includes at least information which indicates the generation of such a problem. The apparatus status information also includes various items of information which are necessary for grasping a periodic status of the diagnosed device 2. Alternatively, when the problem is solved after the transmission of the problem generation notification, the control unit 21 transmits a problem solved notification to the apparatus diagnostic device 1. Furthermore, when receiving an instruction to change the notification standard of the problem generation notification from the apparatus diagnostic device 1 via the communication unit 22, the control unit 21 executes processing to update the notification standard data 24 stored in the storage unit 23 in accordance with the instruction.

The communication unit 22 communicates at least with the apparatus diagnostic device 1 through the network 3. For example, in the case the diagnosed device 2 is a facsimile machine or a multifunction peripheral including a facsimile function, and the network 3 is a public network, the communication unit 22 includes a facsimile communication function. For example, in the case the network 3 is a data exchanging network such as a Local Area Network (LAN) or the Internet, the communication unit 22 can be constructed to communicate by a protocol corresponding to the communication ability or the like of the network 3 or the apparatus diagnostic device 1, such as Transmission Control Protocol/Internet Protocol (TCP/IP), Hyper Text Transfer Protocol (HTTP) using the TCP/IP, Simple Mail Transfer Protocol/Post Office Protocol (SMTP/POP), or Simple Network Management Protocol (SNMP).

The storage unit 23 stores at least the notification standard data 24. The notification standard data 24 is data to be used when a problem is generated within the diagnosed device 2 for determining whether or not to notify the problem generation notification to the apparatus diagnostic device 1. As a simple example, the notification standard data 24 can include data which associates a type of problem and a determination of whether or not to transmit the problem generation notification. Alternatively, another condition can be combined with the above-described simple example. Furthermore, conditions such as a number of times or frequency of the generation of the problem, or a period of time elapsed from the generation of the problem can be added. As described above, various conditions can be set for the notification standard, and the set condition is stored in the storage unit 23 as the notification standard data 24.

Figure 2:
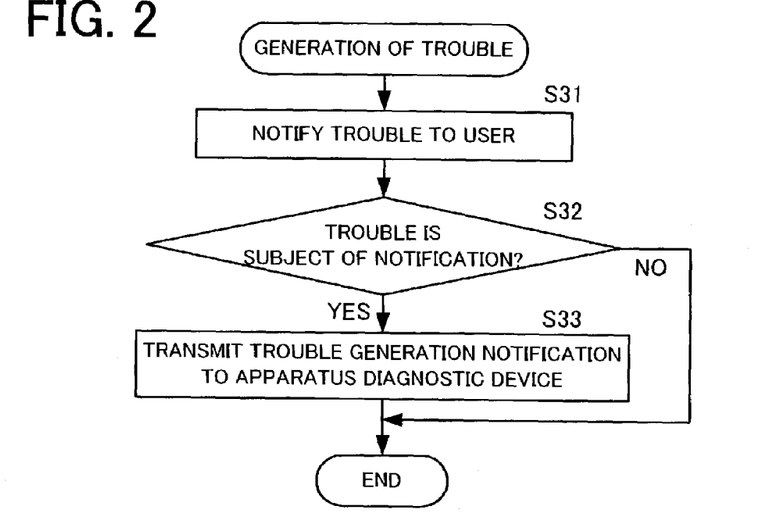
FIG. 2 is a flowchart showing an example operation of when problem generates in a diagnosed device in the example of the system including the first embodiment of the present invention.

Next, an example operation in an example of the system including a first embodiment of the present invention will be described. FIG. 2 is a flowchart showing an example operation of when a problem is generated in the diagnosed device in an example of the system including the first embodiment of the present invention. When a problem occurs in the diagnosed device 2, in step S31, the generation of the problem is sent to the user of the diagnosed device 2. Various well-known methods can be adopted for the notification method. For example, a buzzer provided in the diagnosed device 2 can be activated, a message indicating the generation of the problem can be displayed on a display unit provided on the diagnosed device 2, or a managing user of the diagnosed device 2 can be notified via the communication unit 22 or other communication unit.

Then, in step S32, the control unit 21 determines whether or not the generated problem is subject of the transmission of the problem generation notification to the apparatus diagnostic device 1 in accordance with the notification standard data 24 stored in the storage unit 23. When the generated problem is subject of the transmission of the problem generation notification to the apparatus diagnostic device 1, in step S33, the problem generation notification including information of the generation of the problem is transmitted to the apparatus diagnostic device 1 via the communication unit 22. Further, when the generated problem is not the subject of the transmission of the problem generation notification to the apparatus diagnostic device 1, the problem generation notification is not transmitted to the apparatus diagnostic device 1.

Figure 3:
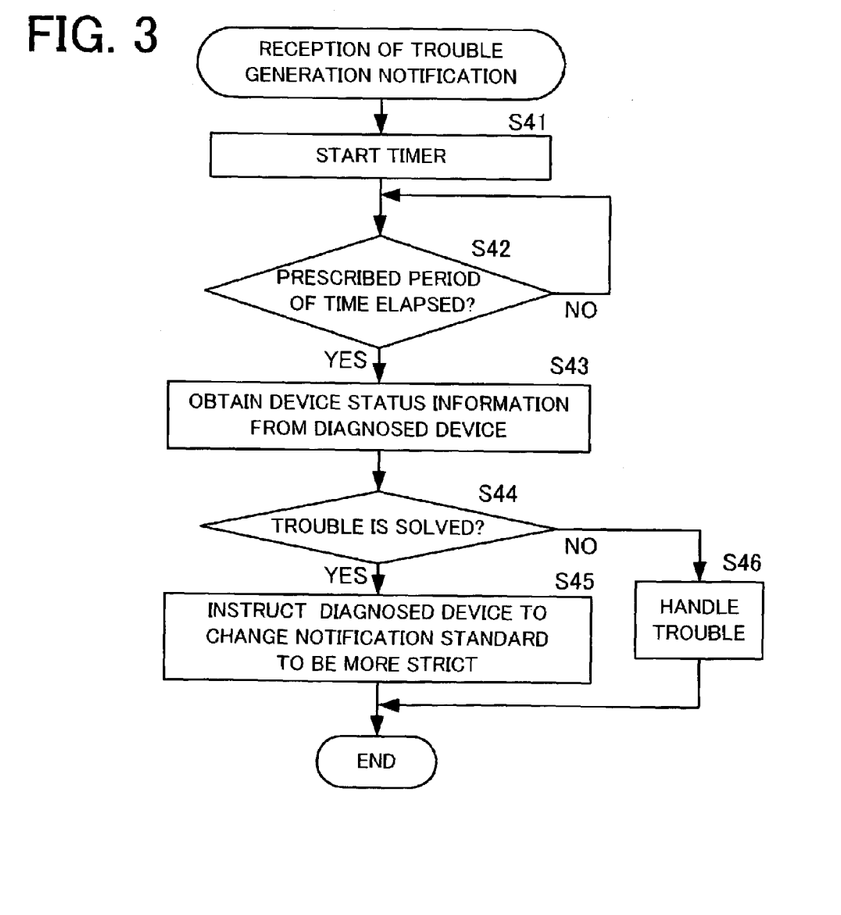
FIG. 3 is a flowchart showing an example operation of when an apparatus diagnostic device receives a problem generation notification in the example of the system including the first embodiment of the present invention.

FIG. 3 is a flowchart showing an example operation of when the apparatus diagnostic device receives the problem generation notification in an example of the system including the first embodiment of the present invention. Here, it will be assumed that the problem generation notification is received from the diagnosed device 2. When receiving the problem generation notification from the diagnosed device 2, in step S41, a timer is started, and in step S42, a prescribed period of time elapses. After an elapse of the prescribed period of time, in step S43, the apparatus status information is requested from the diagnosed device 2 which transmitted the problem generation notification. The apparatus diagnostic device 1 receives the apparatus status information transmitted from the diagnosed device 2, and analyzes the contents of the information. Then, in step S44, it is determined whether or not the problem, which has been a cause for the problem generation notification, has been solved. That is, it is determined whether or not the problem has been solved within a prescribed period of time from the generation of the problem.

When it is determined that the problem has been solved, in step S45, the diagnosed device 2 is instructed to change the notification standard of the problem generation notification for more severe problems. The notification standard data 24 stored in the storage unit 23 of the diagnosed device 2 is updated by the notification. A problem that is similar to the type of problem that was generated this time is excluded from the subject of the notification of the problem generation notification for all notifications thereafter. Further, when the problem is solved within a prescribed period of time, it means that the user of the diagnosed device 2 succeeded in solving the problem. Therefore, in such a case, it can be constructed for a contact to be not made to the user of the diagnosed device 2, or the maintenance worker to not make a visit to the diagnosed device 2. Of course, various processing in the apparatus diagnostic device 1 can be executed. For example, a problem history can be made.

When it is determined that the problem has not been solved even after an elapse of a prescribed period of time, in step S46, processing for the received problem generation notification is executed. For example, the generated problem can be analyzed, the problem can be sent to an administrator of the apparatus diagnostic device 1, and contact can be made to the user of the diagnosed device 2 by telephone, or a maintenance worker can visit the diagnosed device 2. Alternatively, the problem generation notification can be forwarded to another device, and the device which received the forwarded notification can substantially handle the problem. In this case, the diagnosed device 2 is not instructed to change the notification standard. Therefore, the problem generation notification is transmitted for similar types of problems also for all notifications thereafter.

In the above-described operation, the notification standard for the problem which can be solved by the user of the diagnosed device 2 is updated for more severe problems, and not carried out to the apparatus diagnostic device 1 thereafter. As a result, contact by telephone or a visit from the maintenance worker which is unnecessary for the user can be reduced, the satisfaction level of the user can be improved, and the maintenance costs can be reduced. In this case, even when there are several users using the same diagnosed device, the notification standard is updated according to an experience level of each user. Therefore, service can be presented to each of the diagnosed devices according to the experience or the ability of the user. Of course, a problem which cannot be solved by the user can be handled as in the conventional method.

Furthermore, in the above-described operation, even when receiving the problem generation notification, a response is not taken immediately, and after an elapse of a prescribed period of time, it is determined whether or not the problem is solved. Therefore, there is an advantage that in the case of a minute problem which can be solved by the user, even if the problem generation notification is transmitted, contact by telephone or a visit from the maintenance worker which is unnecessary for the user is not made.

Figure 4:
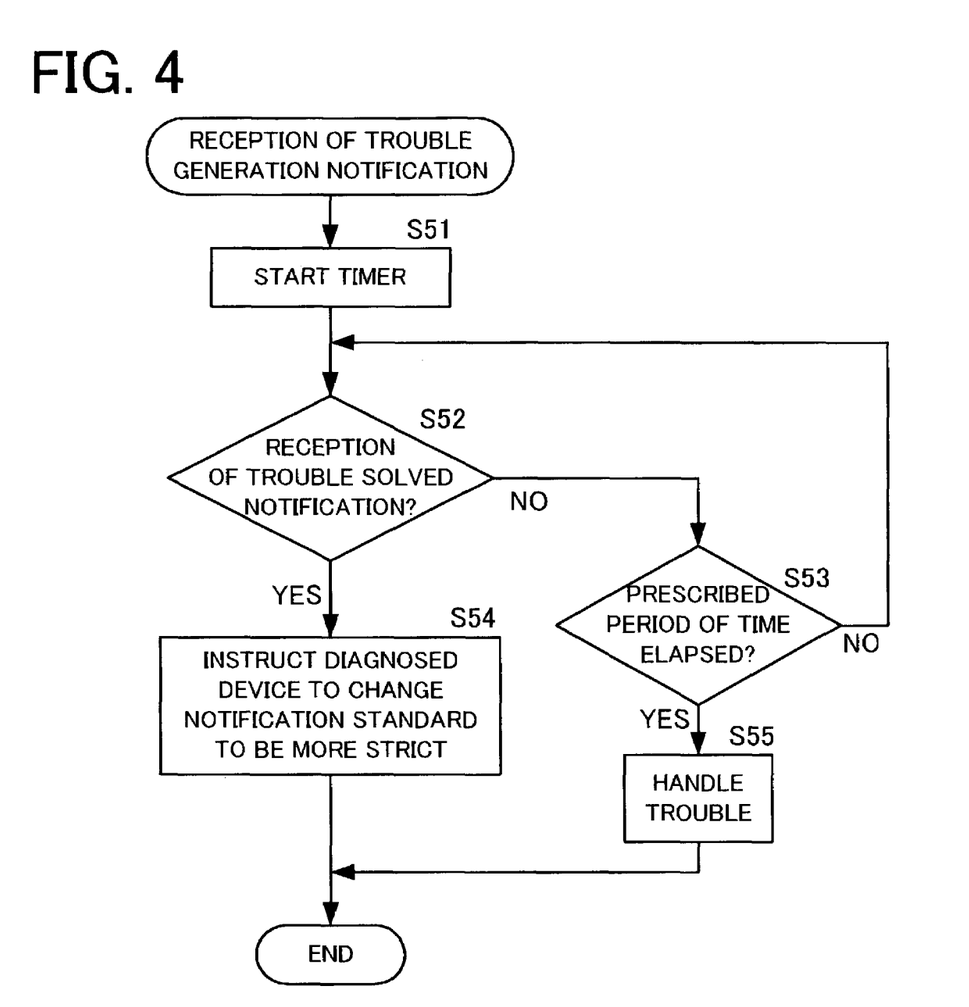
FIG. 4 is a flowchart showing another example operation of when the apparatus diagnostic device receives the problem generation notification in the example of the system including the first embodiment of the present invention.

FIG. 4 is a flowchart showing another example operation of when the apparatus diagnostic device receives the problem generation notification in an example of a system including the first embodiment of the present invention. In the example shown in FIG. 3, the apparatus diagnostic device 1 obtains the apparatus status information from the diagnosed device 2 after an elapse of a prescribed period of time from the reception of the problem generation notification. In the example shown in FIG. 4, when the problem is solved after the problem generation notification is transmitted, the diagnosed device 2 transmits a problem solved notification. Then, the apparatus diagnostic device 1 determines whether or not a problem solved notification has been received from the diagnosed device 2 within a prescribed period of time to determine whether or not the problem that generated in the diagnosed device 2 has been solved. Further, also in this example, it will be assumed that the problem generation notification is received from the diagnosed device 2.

When receiving the problem generation notification from the diagnosed device 2, in step S51, a timer is started. In step S52, it is determined whether or not the problem solved notification has been received from the diagnosed device 2. When the problem solved notification has not been received, in step S53, it is further determined whether or not a prescribed period of time has elapsed. When a prescribed period of time has not elapsed yet, the process returns to step S52. As described above, the processes of step S52 and step S53 are repeated until receiving a problem solved notification or until a prescribed period of time elapses.

When it is determined that the problem solved notification has been received from the diagnosed device 2 in step S52, it means that the problem has been solved within a prescribed period of time. Therefore, in step S54, the diagnosed device 2 is notified to change the notification standard of the problem generation notification for more severe problems, as in step S45 of FIG. 3. The notification standard data 24 stored in the storage unit 23 of the diagnosed device 2 is updated by the notification, and problems which are similar to the type of problem that was generated this time are excluded from the subject of the transmission of the problem generation notification. Further, it can be constructed such that contact or a visit from the maintenance worker to the user of the diagnosed device 2 is not carried out in this case. Of course, various processing in the apparatus diagnostic device 1 can be executed. For example, a problem history can be made.

When it is determined that a prescribed period of time has elapsed in step S53, it means that the problem could not be solved by the user even after an elapse of a prescribed period of time. In this case, in step S55, processing for the received problem generation notification is carried out as in step S46 of FIG. 3. Further, in this case, the diagnosed device 2 is not instructed to change the notification standard. Therefore, the problem generation notification for similar types of problems is transmitted also thereafter.

Also in this example operation, the notification standard for the problems which can be solved by the user of the diagnosed device 2 is updated for more severe problems, and the problem generation notification for such problems is not carried out to the apparatus diagnostic device 1 thereafter. Therefore, contact by telephone or a visit from the maintenance worker which are unnecessary for the user can be reduced. As a result, the satisfaction level of the user can be improved and the maintenance costs can be reduced. Furthermore, in this example operation, it is just necessary to monitor the problem solved notification from the diagnosed device 2 after the generation of the problem, and it is not necessary to check the status of the diagnosed device 2 from the apparatus diagnostic device 1.

Further, in both of the above-described example operations, the instruction to update the notification standard from the apparatus diagnostic device 1 to the diagnosed device 2 is carried out only in a direction in which the notification standard is changed for more severe problems. However, the present invention is not limited to this example. For example, the notification standard can be changed for less severe problems in accordance with the frequency of similar types of problems or the result of the maintenance by the maintenance worker.

Next, an example of a system including a second embodiment of the present invention will be described. Further, a configuration of the system including the second embodiment of the present invention is the same as the configuration shown in FIG. 1. Therefore, the drawing showing the configuration of the system including the second embodiment will be abbreviated, and some of descriptions that overlap with the description for the first embodiment will be abbreviated. In the above-described first embodiment, the apparatus diagnostic device 1 instructs the diagnosed device to change the notification standard for the transmission of the problem generation notification. However, in the second embodiment, the diagnosed device 2 can change the notification standard without an instruction from the apparatus diagnostic device 1. Therefore, the apparatus diagnostic device 1 can have a configuration the same as the configuration of the conventional diagnostic device.

When detecting the generation of a problem in the diagnosed device 2, the control unit 21 of the diagnosed device 2 determines whether or not the problem is subject of transmission of the problem generation notification to the apparatus diagnostic device 1 in accordance with the notification standard data 24 stored in the storage unit 23. Then, when it is determined that the problem is subject of the transmission of the notification, the problem generation notification is transmitted to the apparatus diagnostic device 1 via the communication unit 22. After an elapse of a prescribed period of time from the transmission of the problem generation notification, it is determined whether or not the problem is solved. When it is determined that the problem is solved, the notification standard data 24 is updated such that the notification standard of the problem generation notification for the problem is changed for more severe problems. Moreover, when it is determined that the problem is not the subject of the transmission of the problem generation notification, and the problem generation notification is not transmitted, it is determined after an elapse of a prescribed period of time, whether or not the problem has been solved. When the problem is not solved even after an elapse of a prescribed period of time without transmitting the problem generation notification, the notification standard data 24 is changed such that the notification standard of the problem generation notification is for less severe problems. In this case, the problem generation notification can be transmitted to the apparatus diagnostic device 1, or a message to recommend the user of the diagnosed device 2 to contact the service center or the like can be output. Further, as in the above-described first embodiment, various methods can be applied for the method to change the notification standard for more severe or less severe problems.

Next, an example operation in an example of the system including the second embodiment of the present invention will be described. Further, the apparatus diagnostic device 1 can be operated in the same way as the conventional diagnostic device. Therefore, the description for the operation of the apparatus diagnostic device 1 will be abbreviated.

Figure 5:
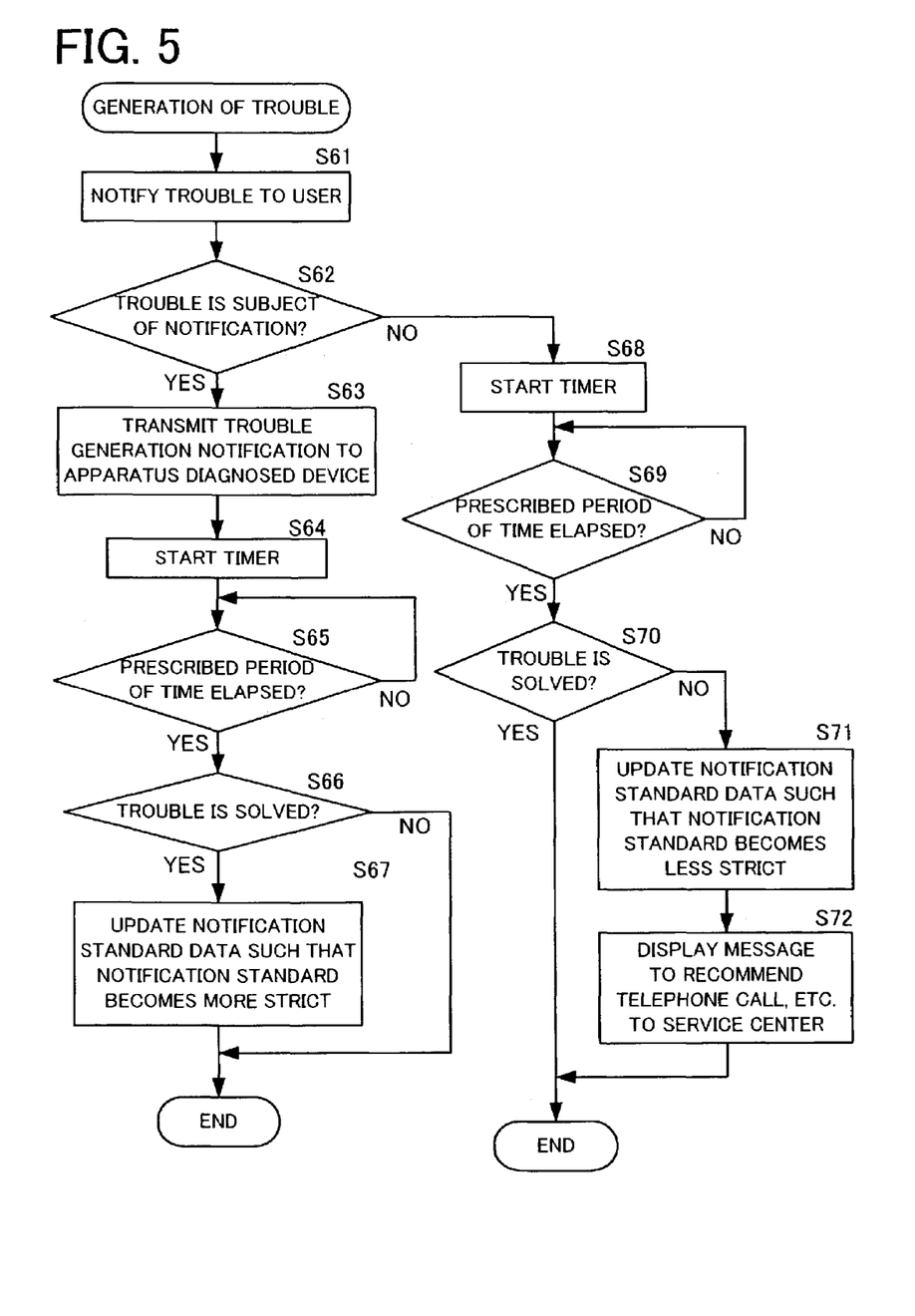
FIG. 5 is a flowchart showing an example operation of a diagnosed device in an example of a system including a second embodiment of the present invention.

FIG. 5 is a flowchart showing an example operation of the diagnosed device in an example of the system including the second embodiment of the present invention. When a problem is generated in the diagnosed device 2, in step S61, the generation of the problem is notified to the user of the diagnosed device 2. A notification method can be any method as in the above-described first embodiment. For example, a buzzer can be activated, a message can be displayed, or a managing user can be notified.

In step S62, the control unit 21 determines whether or not the generated problem is subject of the transmission of the problem generation notification to the apparatus diagnostic device 1 in accordance with the notification standard data 24 stored in the storage unit 23. When it is determined that the generated problem is the subject of the transmission of the problem generation notification to the apparatus diagnostic device 1, in step S63, the problem generation notification including the information of the generation of the problem is transmitted to the apparatus diagnostic device 1 via the communication unit 22.

In step S64, a timer is started, and in step S65, a prescribed period of time elapses. Further, the timer can be started under any timing between the generation of the problem and when the timer is started in step S64. For example, the timer can be started before transmitting the problem generation notification. Then, after an elapse of a prescribed period of time, in step S66, it is determined whether or not the problem has been solved. That is, it is determined whether or not the problem has been solved within a prescribed period of time from the generation of the problem.

When it is determined that the problem has been solved, in step S67, the notification standard data 24 is updated such that the notification standard of the problem generation notification is for more severe problems. Accordingly, a problem similar to the type of problem that generated this time can be excluded from the subject of the notification of the problem generation notification for all notifications thereafter. Further, when the problem is not solved even after an elapse of a prescribed period of time, the processing is ended without updating the notification standard data 24. In this case, since the problem generation notification is transmitted to the apparatus diagnostic device 1 in step S63, it can be considered that there will be contact from the service center or the like by telephone, or a visit will be made by the maintenance worker. Therefore, the processing for when the problem generates in the diagnosed device 2 ends here.

When it is determined that the generated problem is not the subject of the transmission of the problem generation notification in step S62, the problem generation notification is not transmitted to the apparatus diagnostic device 1, but processing is carried out thereafter according to whether or not the problem has been solved within a prescribed period of time. Therefore, in step S68, the timer is started, and in step S69, a prescribed period of time elapses. Further, the timer can be started under any timing between the generation of the problem and the elapse of the prescribed period of time. Then, after an elapse of the prescribed period of time, in step S70, it is determined whether or not the problem has been solved. That is, it is determined whether or not the problem has been solved within a prescribed period of time from the generation of the problem.

When it is determined that the problem has been solved, the processing ends. In this case, the user has solved the problem without receiving contact from the service center by telephone or service by the maintenance worker. In addition, since the problem generation notification is not transmitted, the notification standard data 24 is not updated to maintain the present status.

When the problem has not been solved yet, in step S71, the notification standard data 24 is updated such that the notification standard of the problem generation notification is for less severe problems. Accordingly, for example, a problem which is similar to the type of problem that is generated this time can be included in the subject of the notification of the problem generation notification for all notifications thereafter. As a result, it can be prevented from the problem generation notification not being sent even when a problem generates as in this time. Moreover, in this case, the problem is not solved yet, and it can be considered that the problem cannot be solved only by the user. Therefore, in step S72, for example, a message or the like which recommends the user to contact the service center by telephone is displayed. For example, a telephone number of the service center can be displayed, and the user can be recommended to receive service by telephone. Accordingly, the user can make a telephone call to the service center, and can accept instructions for solving the problem. Alternatively, the user can ask for the maintenance worker to be sent.

Further, the processing of step S71 and step S72 can be carried out in any order. Moreover, in step S72, the problem generation notification can be transmitted to the apparatus diagnostic device 1. Alternatively, the process can be returned to step S62, and in accordance with the notification standard updated in step S71, it can be determined again whether or not the problem is subject of the notification of the problem generation notification. By repeating the process as described above, for example, when changing the notification standard gradually, the notification standard of the problem can be changed for less severe problems with an elapse of time. Accordingly, when the user can solve the problem, the problem generation notification is not transmitted for a long period of time, and in delicate cases, it can be set to transmit the problem generation notification after an elapse of a prescribed period of time.

As described above, the notification standard of the problem generation notification is changed in accordance with the circumstances of the user dealing with problems in the diagnosed device 2. Therefore, for example, if the user has experience in handling of the diagnosed device 2, simple problems can be excluded from the subject of the notification of the problem generation notification even when the problems are the subject of the notification. Moreover, if the user is not experienced in handling the diagnosed device 2, even if the problem is a simple problem which is generally excluded from the subject of the notification of the problem generation notification, such a problem can be handled as a problem subject of the notification from that time and for all times afterwards.

What is claimed is:

1. An apparatus diagnostic device comprising:
   means for communicating with a diagnosed device through a communication line; and
   means for controlling that receives a problem generation notification sent from the diagnosed device in accordance with a notification standard after a problem has been detected in the diagnosed device via the means for communicating, and that determines whether or not a problem solved notification has been received from the diagnosed device within a prescribed period of time after the problem generation notification is received,
   wherein when the means for controlling determines that the problem solved notification is received within the prescribed period of time, the means for controlling transmits to the diagnosed device via the means for communicating an instruction to change the notification standard to be more strict for future occurrences of the problem.

2. The apparatus diagnostic device according to claim 1, wherein the instruction to change the notification standard lengthens a period of time from the detection of the problem until carrying out the problem generation notification.

3. The apparatus diagnostic device according to claim 1, wherein the means for controlling carries out a diagnosis in accordance with the contents of the problem generation notification received from the diagnosed device.

4. A diagnosed device comprising:
   means for communicating through a communication line;
   means for storing a notification standard which is a standard for determining whether or not to transmit a problem generation notification; and
   means for controlling that references the notification standard stored in the means for storing when a problem is generated, that transmits the problem generation notification to an apparatus diagnostic device via the means for communicating when the notification standard is satisfied, that determines whether or not the problem is solved after an elapse of a prescribed period of time from generation of the problem and that changes the notification standard when necessary,
   wherein when the means for controlling determines that the problem is solved, the means for controlling changes the notification standard to be more strict for future occurrences of the problem.

5. The diagnosed device according to claim 4, wherein the means for controlling changes the notification standard to lengthen a period of time from the generation of the problem until the problem generation notification is carried out.

6. A diagnosed device comprising:
   means for communicating through a communication line;
   means for storing a notification standard which is a standard for determining whether or not to transmit a problem generation notification; and
   means for controlling that references the notification standard stored in the means for storing when a problem is generated, that transmits the problem generation notification to an apparatus diagnostic device via the means for communicating when the notification standard is satisfied, that determines whether or not the problem is solved after an elapse of a prescribed period of time from generation of the problem, and that changes the notification standard when necessary,
   wherein when the means for controlling determines that the problem is not solved, the means for controlling changes the notification standard to be less strict for future occurrences of the problem.

7. A diagnosed device comprising:
   means for communicating through a communication line;
   means for storing a notification standard which is a standard for determining whether or not to transmit a problem generation notification; and
   means for controlling that references the notification standard stored in the means for storing when a problem is generated, that transmits the problem generation notification to an apparatus diagnostic device via the means for communicating when the notification standard is satisfied, that determines whether or not the problem is solved after an elapse of a prescribed period of time from generation of the problem, and that changes the notification standard when necessary,
   wherein when the means for controlling determines that the problem is solved, the means for controlling changes the notification standard to be more strict, and when the means for controlling determines that the problem is not solved, the means for controlling changes the notification standard to be less strict.

* * * * *